United States Patent [19]

Imaizumi et al.

[11] Patent Number: 4,646,865
[45] Date of Patent: Mar. 3, 1987

[54] SHAFT-DRIVEN MOTOR VEHICLE

[75] Inventors: Masahiro Imaizumi; Hiroshi Akai; Takafumi Irie; Takashi Inagaki, all of Saitama, Japan

[73] Assignee: Honda Giken Kogyo Kabushiki Kaisha, Tokyo, Japan

[21] Appl. No.: 755,935

[22] Filed: Jul. 16, 1985

[30] Foreign Application Priority Data

Jul. 16, 1984 [JP] Japan ................................ 59-147325

[51] Int. Cl.$^4$ ............................................. B62D 61/06
[52] U.S. Cl. .................................... 180/73.1; 180/215
[58] Field of Search ............... 180/215, 210, 216, 297, 180/73.1, 71, 75

[56] References Cited

U.S. PATENT DOCUMENTS

| 4,267,896 | 5/1981 | Hendriksen | 180/73.1 |
| 4,325,449 | 4/1982 | D'Addio et al. | 180/215 |
| 4,540,061 | 9/1985 | Watanabe | 180/73.1 |

FOREIGN PATENT DOCUMENTS

| 152790 | 11/1981 | Japan . |
| 92280 | 5/1984 | Japan . |
| 120580 | 7/1984 | Japan . |

Primary Examiner—Richard A. Bertsch
Attorney, Agent, or Firm—Irving M. Weiner; Joseph P. Carrier; Pamela S. Burt

[57] ABSTRACT

A three- or four-wheeled motor vehicle such as a buggy includes a rear fork composed of first and second rear fork members having front ends pivotally mounted on a frame and rear ends supporting rear wheels, respectively, an axle housing having first and second axial ends, the first axial end being joined to the rear end of the first rear fork member, a rear axle rotatably supported in the axle housing, a gear case coupled between the rear end of the second rear fork member and the second axial end of the axle housing and accommodating a gear mechanism for driving the rear axle, and at least one cross member extending between and joined to the first and second rear fork members. The rear end of the first rear fork member has a first joining surface having at least one attachment hole defined therein and directed transversely of the frame. The first end of the axle housing has a second joining surface having at least one attachment hole defined therein and facing the first joining surface. At least one of the attachment holes in the first and second joining surfaces is elongate. The first rear fork member and the axle housing are joined by fasteners through the attachment holes.

4 Claims, 8 Drawing Figures

SHAFT-DRIVEN MOTOR VEHICLE

BACKGROUND OF THE INVENTION

1. Field of the Invention

The present invention relates to a shaft-driven three- or four-wheeled motor vehicle having two rear wheels and a rear fork supporting the rear wheels.

2. Description of the Relevant Art

Three- or four-wheeled motor vehicles having two rear wheels are in use today. Such existing motor vehicles include a swing-arm rear fork supporting the two rear wheels and a shaft-drive mechanism for rotating the rear wheels. The rear fork includes a pair of laterally spaced members, one of which supports a drive shaft extending therethrough, the other member supporting a gear case mounted thereon. In one conventional design, the rear fork member supporting the drive shaft extends back to an axle housing and is integral therewith, and the other rear fork member is shorter with the axle housing coupled thereto. These components are machined and assembled together accurately such that the axis of the axle shaft through the axle housing extends at an angle to the axis of the gear case, and the axis of the pivot of a rear fork lies parallel to the axis of the axle shaft.

One conventional rear wheel support arrangement is disclosed in Japanese Laid-Open Patent Publication No. 59-92280. In the disclosed arrangement an axle housing, one half of one rear fork member, and a gear case are integrally joined in a U-shaped confirguration. The half of one rear fork member, which is laterally spaced from a second rear fork member in which a shaft-drive mechanism is mounted, and the other half of said one rear fork member are coupled end-to-end by axially extending bolts. The gear case and the second rear fork member are similarly coupled together. If there is a positional error or misalignment at the time the gear case and the second rear fork member are assembled together, then the ends of the halves of said one rear fork member are also displaced with respect to each other. Any clearance or displacement resulting from such a positional error is required to be adjusted or eliminated by a shim or the like, a process which makes the assembling procedure tedious and time-consuming.

SUMMARY OF THE INVENTION

It is an object of the present invention to provide a shaft-driven motor vehicle including a rear fork composed of a pair of rear fork members, one of which includes a gear case, the rear fork members being constructed such that they can easily be assembled together with a desired degree of accuracy.

According to the present invention, there is proivded a motor vehicle such as a three- or four-wheeled buggy including a frame, a rear fork composed of first and second rear fork members having front ends pivotally mounted on the frame and rear ends supporting rear wheels, respectively, an axle housing having first and second axial ends, the first axial end being joined to the rear end of the first rear fork member, a rear axle rotatably supported in the axle housing, a gear case coupled between the rear end of the second rear fork member and the second axial end of the axle housing and accommodating a gear mechanism for driving the rear axle, at least one cross member extending between and joined to the first and second rear fork members, the rear end of the first rear fork member having a first joining surface having at least one attachment hole defined therein and directed transversely of the frame, the first end of the axle housing having a second joining surface having at least one attachment hole defined therein and facing the first joining surface, at least one of the attachment holes in said first and second joining surfaces being elongate, and fastening means for joining the first rear fork member and the axle housing through the attachment holes.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 5:
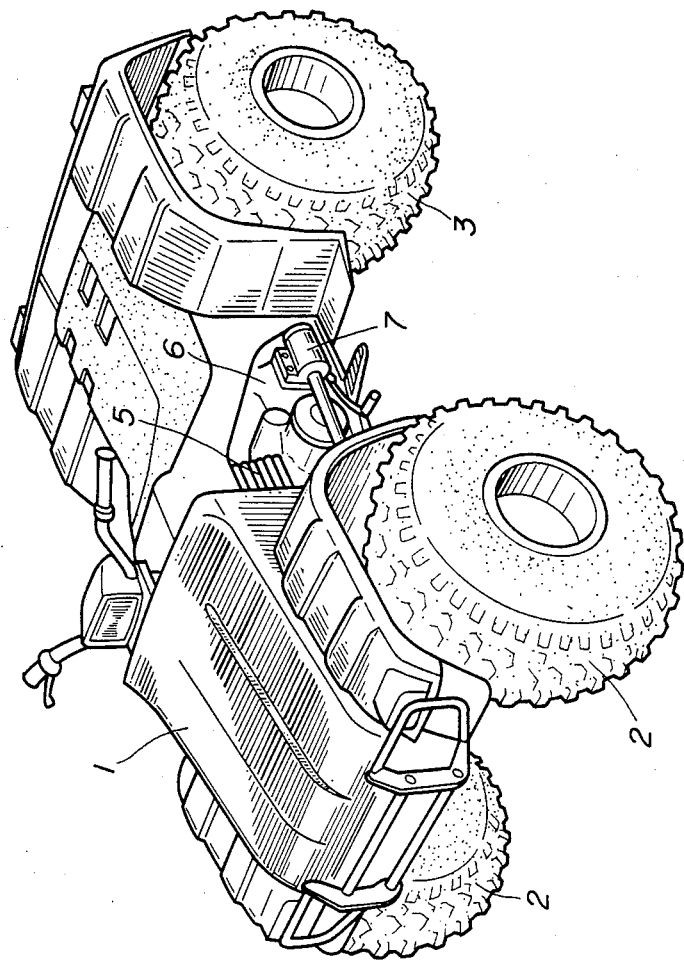
FIG. 5 is a perspective view of a motor vehicle according to one embodiment of the present invention.

FIG. 5 shows in perspective a shaft-driven four-wheeled motor vehicle according to a first embodiment of the present invention. The motor vehicle has two steerable front drive wheels 2, 2 rotatably supported on a front end portion of the motor vehicle and two rear drive wheels 3, 3 rotatably supported on a rear end portion of the motor vehicle. The front and rear wheels 2, 3 include tires designed for off-road use.

Figure 4:
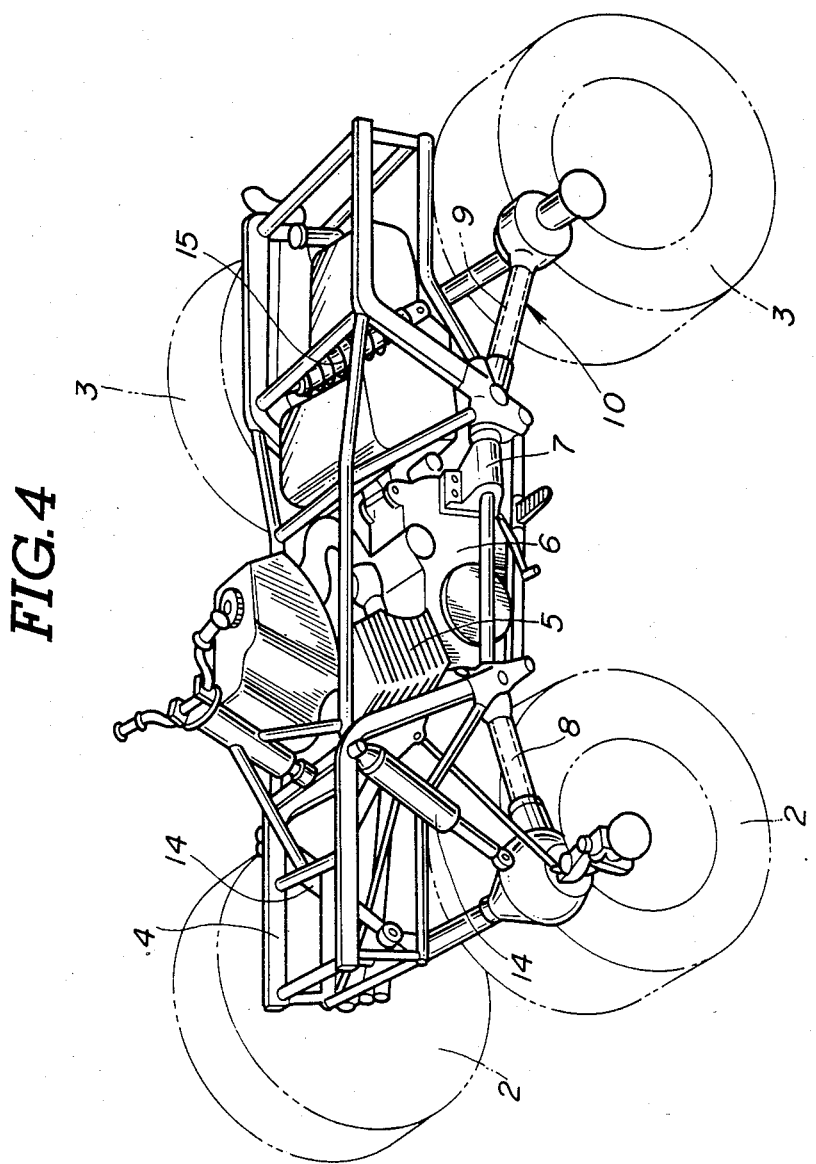
FIG. 4 is a perspective view of the frame of the motor vehicle shown in FIG. 5.

FIG. 4 shows a frame construction of the motor vehicle illustrated in FIG. 5. The frame construction includes a frame 4 supporting an engine 5 in its middle portion, the engine 5 having a lower transmission case 6 including a power output device 7. The power output device 7 is operatively connected through a drive shaft 8 to the front wheels 2 to drive the same, and through a drive shaft 9 to the rear wheels 3 to drive the same. The front wheels 2 are coupled to the frame 4 by two laterally spaced front cushioning dampers or shock absorbers 14. The rear wheels 3 are supported by a rear fork 10 on the frame 4. The rear fork 10 is pivotally connected to the frame 4 by a pivot having an axis Q extending parallel to a rear axle 16 (FIG. 1) described later on. The rear wheels 3 are coupled to the frame 4 by a rear cushioning damper or shock absorber 15.

Figure 1:
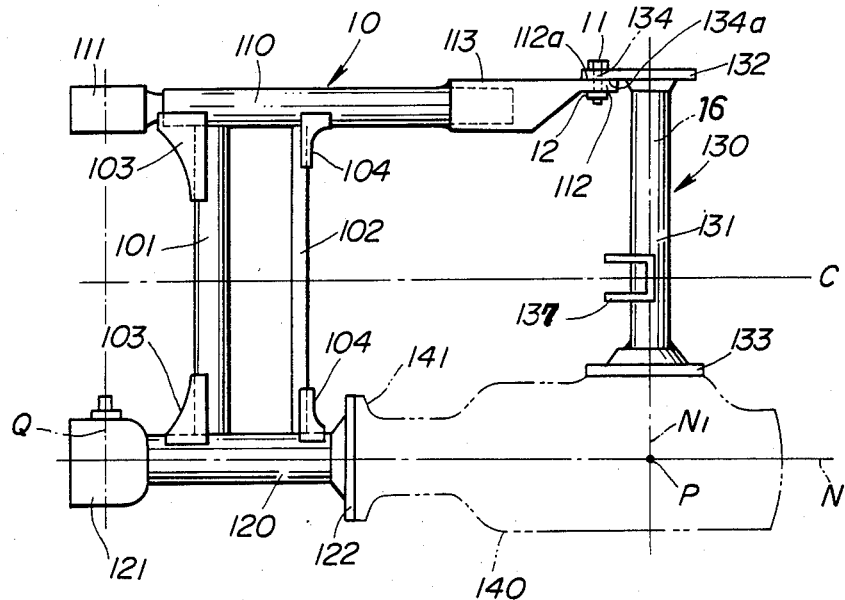
FIG. 1 is a plan view of a rear fork incorporated in a shaft-driven three- or four-wheeled motor vehicle according to the present invention.
Figure 2:
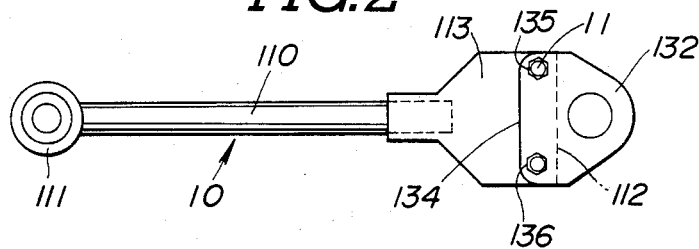
FIG. 2 is a side elevational view of the rear fork shown in FIG. 1.
Figure 3:
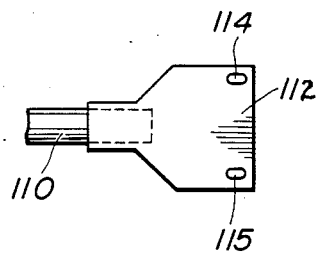
FIG. 3 is a fragmentary side elevational view of a portion of the rear fork of FIG. 1.

FIG. 1 shows the rear fork 10 on an enlarged scale. The rear fork 10 includes first and second members 110, 120 spaced transversely from each other and extending parallel to the longitudinal central axis C of the motor vehicle. The rear fork members 110, 120 have on their front ends pivotal supports 111, 121, respectively, pivotally mounted as the pivot on rear lower portions of the frame 4. Two parallel cross members 101, 102 extend transversely between to the rear fork members 110, 120 rearwardly of the pivotal supports 111, 121. The cross members 101, 102 are joined at their ends to the rear fork members 110, 120 by reinforcing pieces 103, 104. The cross members 101, 102 and the rear fork members 110, 120 jointly form a substantially H-shaped configuration as seen in plan.

The second rear fork member 120, which is on the lefthand side when the motor vehicle is viewed from behind, has a length which is about one half of the distance between the rear axle and the pivot of the rear fork 10. The second rear fork member 120 is in the form of a pipe of a circular cross section having on its rear end an attachment flange 122 lying perpendicularly to the axis of the second rear fork member 120.

The first rear fork member 110, which is on the righthand side, is in the form of a pipe having a rectangular cross section and is longer than the second rear fork member 120. The first rear fork member 110 has on its rear end a plate-like attachment member 112 extending in a vertical plane and projecting rearwardly, the attachment member 112 having a first joining surface 112a joined to an axle housing described herein below. In the illustrated embodiment, the attachment member 112 is separate from the first rear fork member 110 and has a front portion 113 shaped as a pipe of a rectangular cross section which is complementarily fitted over the rear end of the first rear fork member 110 and welded thereto. Alternatively, the rear end of the first rear fork member 110 may be flattened into the attachment member 112.

An axle housing 130 supported transversely on the rear end of the rear fork 10 has a body 131 in the form of a pipe having a circular cross section. The axle housing body 131 has a longer portion on the righthand side of the axis C than a portion thereof on the lefthand side of the axis C. The axle housing 130 has on its opposite ends attachment flanges 132, 133 lying parallel to the axes of the rear fork members 110, 120, respectively. The rear axle 16 extends through the axle housing 130.

The flange 132 on the end of the longer righthand portion of the axle housing body 131 includes a front portion 134 extending in a vertical plane and having a second joining surface 134a facing in overlapping relation to the first joining surface 112a of the attachment member 112. Vertically spaced attachment holes 114, 115 and 135, 136 are defined in the first and second joining surfaces 112a, 134a, respectively. The attachment holes 114, 115 in the attachment member 112 are elongate in a direction parallel to the axis C. A damper bracket 137 is mounted on the axle housing body 131 in alignment with the axis C. The rear cushioning damper 15 (FIG. 4) has a lower end supported by the damper bracket 137 and an upper end supported by the frame 4.

A gear case 140 housing a shaft-drive gear mechanism for driving the rear axle 16 is positioned behind the second rear fork member 120 and has a front flange 141 fastened to the flange 122 of the second fork member 120 by axial bolts (not shown). The gear case 140 thus serves as a rear half portion of the second rear fork member 120. The flange 133 on the shorter lefthand portion of the rear axle housing body 131 is fastened by bolts (not shown) to a rear inner surface of the gear case 140.

The second joining surface 112a of the attachment member 112 of the first rear fork member 110 and the second joining surface 134a of the front portion 134 of the flange 132 are held against each other, and then they are fastened together by bolts 11 and nuts 12, the bolts 11 extending through the attachment holes 114, 115 and 135, 136 parallel to the rear axle 16. In the foregoing embodiment, the gear case 140, the second rear fork member 120, and the axle housing 130 are preassembled together. When the attachment member 112 and the flange 132 are to be joined to each other, the rear axle 16 can be adjusted so as to lie parallel to the pivot axis Q to an extent allowed by the elongate attachment holes 114, 115. The attachment member 112 and the flange 132 are coupled directly together by the bolts 11 extending perpendicularly to the axis C and the nuts 12. Therefore, it is not required to install any adjusting shim and adjust such a shim in connecting the first rear fork member 110 to the axle housing 130.

While the attachment holes 114, 115 in the attachment member 112 are shown as being elongate, the attachment holes 135, 136 in the flange 132 may instead be elongate parallel to the axis C.

As assembled, the second rear fork member 120 and the gear case 140 have an axis N crossing the axis N1 of the axle housing 130 at a point P at a prescribed allowable angle range which may be 90°±1°, for example.

Figure 6:
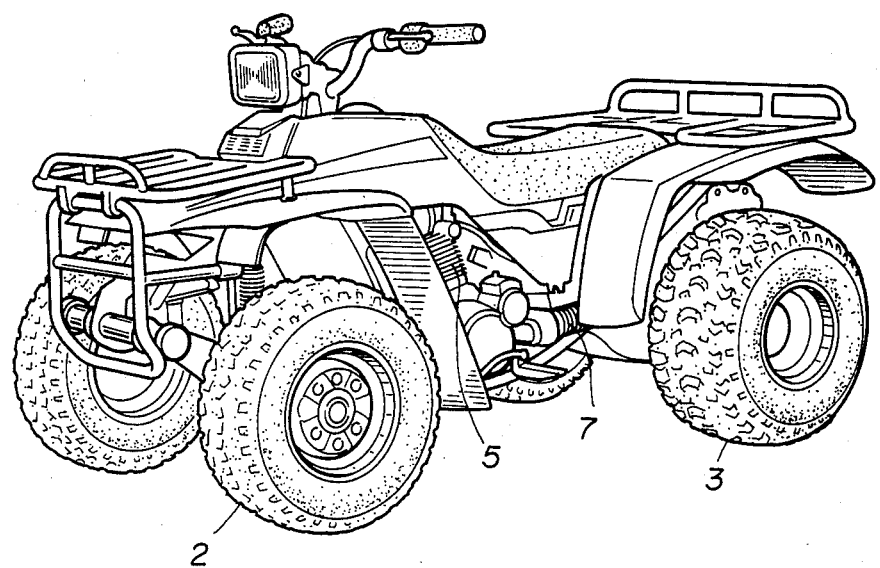
FIG. 6 is a perspective view of a shaft-driven motor vehicle according to another embodiment of the present invention.
Figure 8:
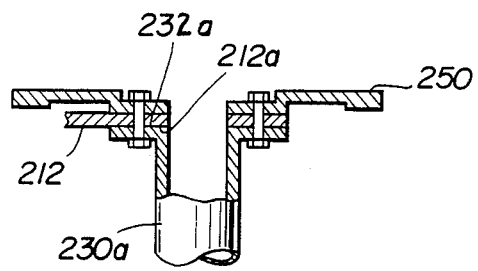
FIG. 8 is a cross-sectional view of a portion of the motor vehicle shown in FIG. 7.
Figure 7:
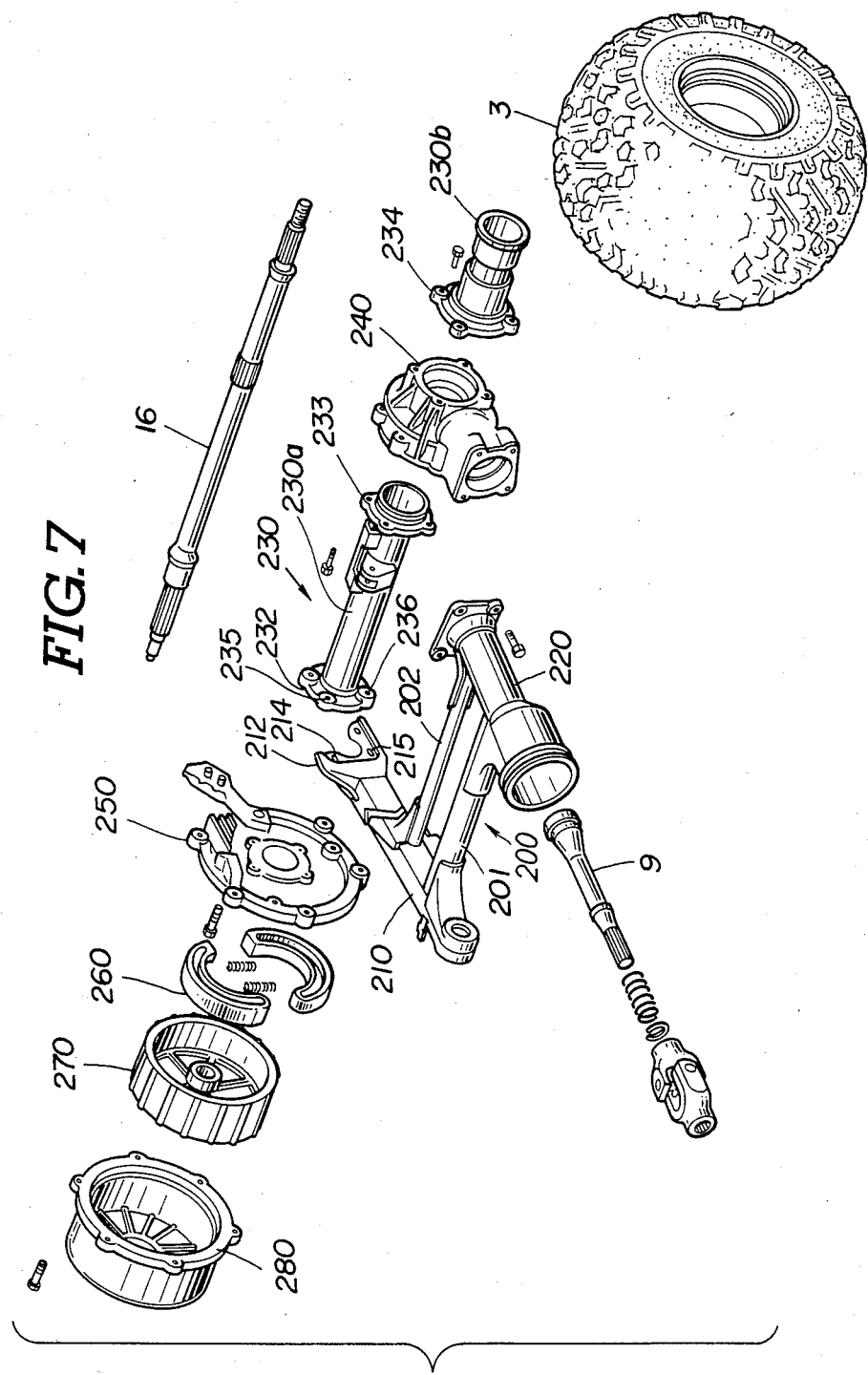
FIG. 7 is a partial exploded perspective view of a portion of the motor vehicle illustrated in FIG. 6.

FIGS. 6 through 8 illustrate a shaft-driven motor vehicle according to another embodiment of the present invention. The illustrated motor vehicle is a so-called four-wheeled buggy which is different from the four-wheeled motor vehicle of the foregoing embodiment as to the configuration of the rear end of a rear fork and the manner of coupling the same to an axle housing, and also in that a brake panel is attached to the joint where the rear fork and the axle housing are coupled. More specifically, an axle housing 230 is composed of first and second axle housing members 230a, 230b, the first axle housing member 230a having flanges 232, 233 on its axially opposite ends. The flange 232 is joined to the joining end 212 of a first rear fork member 210 of a rear fork 200, and the flange 233 is joined to an end of a gear case 240. The second axle housing member 230b has on one side a flange 234 through which the second axle housing member 230b is connected to the opposite side of the gear case 240 by bolts and nuts. A rear axle 16 extends through the axle housing 230. Rear wheels 3 are attached to the axially opposite ends of the rear axle 16 in a suitable manner. The joining end 212 of the first rear fork member 210 comprises a U-shaped plate opening rearwardly and having a first joining surface 212a with elongate attachment holes 214, 215 defined therein. The flange 232 of the first axle housing member 230a has a second joining surface 232a having attachment holes 235, 236 defined therein. The first rear fork member 210 is fixed to the first axle housing 230a by holding the first and second joining surfaces 112a, 232a against each other, inserting bolts through the attachment holes 214, 215 and 235, 236, and tightening nuts on the bolts. At the same time, a brake panel 250 is also fastened by the bolts to the outer side of the joining end 212, as better shown in FIG. 8. To the outer side of the brake panel 250, there are attached a brake shoe 260, a drum 270, and a drum cover 230 successively in the order named. The rear axle 16 extends also through the brake panel 250, the brake shoe 260, the drum 270, and the drum cover 280. The rear fork 200 has a second rear fork member 220 fastened at its rear end to the front end of the gear case 240. Two cross members 201, 202 extend transversely between and are joined to the first and second rear fork members 210, 220.

In the embodiment shown in FIGS. 6 through 8, the joining end 212 of the first rear fork member 210 and the flange 232 of the first axle housing member 230a are coupled together, as discussed above, by holding the first and second joining surfaces 212a, 232a against each other, inserting the bolts through the elongate attachment holes 214, 215 and the attachment holes 235, 236, and tightening the nuts on the bolts. Therefore, these members can be assembled efficiently without requiring any adjusting shim. Since the rear axle 16 is covered substantially along its entire length by the first axle housing members 230a, 230b, the drum cover 280, and other components, the rear axle 16 is protected from earth and sand, stones, dust, and other foreign matter.

With the arrangement of the present invention, therefore, the rear fork and the axle housing can be adjustably assembled together efficiently through a simple construction without requiring any adjusting shims.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motor vehicle comprising:
   a frame;
   a rear fork composed of first and second rear fork members having front ends pivotally mounted on said frame and rear ends supporting rear wheels, respectively;
   an axle housing having first and second axial ends, said first axial end having an attachment flange joined to the rear end of said first rear fork member;
   a rear axle rotatably supported in said axle housing;
   a gear case coupled between the rear end of said second rear fork member and said second axial end of said axial housing and accommodating a gear mechanism for driving said rear axle;
   at least one cross member extending between and joined to said first and second rear fork members;
   said rear end of said first rear fork member having a first joining surface having at least one attachment hole defined therein and directed transversely of said frame;
   said attachment flange of said axle housing having a second joining surface having at least one attachment hole defined therein and facing said first joining surface;
   at least one of said attachment holes in said first and second joining surfaces being elongate; and
   fastener means for joining said first rear fork member and said axle housing through said attachment holes.

2. A motor vehicle according to claim 1, wherein said rear end of said first rear fork member has a substantially U-shaped configuration opening rearwardly.

3. A motor vehicle according to claim 1, including a brake panel attached to an outer side of said rear end of said first rear fork member, said rear end of said first rear fork member being sandwiched between said brake panel and said attachment flange.

4. A motor vehicle according to claim 1, wherein said first and second rear fork members and said cross member jointly form a substantially H-shaped configuration as seen in plan.

* * * * *